(12) United States Patent
Pathak (10) Patent No.: US 10,399,698 B2
(45) Date of Patent: Sep. 3, 2019

(54) SYSTEMS AND METHODS FOR SMART VISION RUNWAY LANDING DISPLAY

(71) Applicant: Rockwell Collins, Inc., Cedar Rapids, IA (US)

(72) Inventor: Prashant Kumar Pathak, Burnpur (IN)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 16/110,360

(22) Filed: Aug. 23, 2018

(65) Prior Publication Data

US 2019/0084691 A1  Mar. 21, 2019

(30) Foreign Application Priority Data

Sep. 16, 2017 (IN) .............................. 201711032810

(51) Int. Cl.
*B64D 45/08* (2006.01)
*G08G 5/00* (2006.01)

(52) U.S. Cl.
CPC .......... *B64D 45/08* (2013.01); *G08G 5/0047* (2013.01)

(58) Field of Classification Search
None
See application file for complete search history.

(56) References Cited

U.S. PATENT DOCUMENTS

| | | | | |
|---|---|---|---|---|
| 6,320,579 B1* | 11/2001 | Snyder | ................. | G01C 23/005 345/419 |
| 10,089,894 B1* | 10/2018 | Chandrashekarappa | | ................... H04N 5/00 |
| 2008/0195309 A1* | 8/2008 | Prinzel, III | ............ | G01C 23/00 701/532 |
| 2008/0312779 A1* | 12/2008 | Sacle | ................... | G01C 23/005 701/7 |
| 2010/0117867 A1* | 5/2010 | He | ......................... | G01C 23/00 340/974 |
| 2010/0161158 A1* | 6/2010 | Gannon | ................. | G01C 23/00 701/4 |
| 2013/0106832 A1* | 5/2013 | Meeker | .............. | G01C 21/3638 345/419 |
| 2014/0354456 A1* | 12/2014 | Gannon | ............... | G08G 5/0047 340/972 |

(Continued)

Primary Examiner — Fekadeselassie Girma
(74) *Attorney, Agent, or Firm* — Donna P. Suchy; Daniel M. Barbieri (57) ABSTRACT

A system for an airborne platform includes a display device and a processing circuit communicably coupled to the display device. The display device is configured to provide a display. The processing circuit is configured to determine one or more performance characteristics of the aircraft, a predicted landing path including a predicted touch down point of a runway, and whether the predicted touch down point is within a recommended touch down zone. The processing circuit is further configured to generate a three-dimensional display providing a visual representation of the aircraft, the runway, and the predicted landing path. The visual representation of the predicted landing path is provided as a first color in response to determining the touch down point is within the recommended touch down zone and the visual representation of the predicted landing path is provided as a second color in response to determining the touch down point is not within the recommended touch down zone.

20 Claims, 6 Drawing Sheets

(56) References Cited

U.S. PATENT DOCUMENTS

| | | | |
|---|---|---|---|
| 2016/0107766 A1* | 4/2016 | He | B64D 45/08 |
| | | | 701/7 |
| 2016/0247406 A1* | 8/2016 | Khatwa | G05D 1/0061 |
| 2016/0347473 A1* | 12/2016 | Khatwa | B60T 8/1703 |
| 2017/0036776 A1* | 2/2017 | He | B64D 43/00 |
| 2017/0057658 A1* | 3/2017 | Sabnis | B64D 45/00 |
| 2017/0214904 A1* | 7/2017 | Wyatt | H04N 13/302 |
| 2017/0243497 A1* | 8/2017 | Kuttappan | G08G 5/025 |
| 2018/0127111 A1* | 5/2018 | Feyereisen | B64C 25/42 |

* cited by examiner

SYSTEMS AND METHODS FOR SMART VISION RUNWAY LANDING DISPLAY

CROSS-REFERENCE TO RELATED PATENT APPLICATION

The present application claims the benefit of and priority to Indian Application Serial No. 201711032810 filed on Sep. 16, 2017, entitled "SYSTEMS AND METHODS FOR SMART VISION RUNWAY LANDING DISPLAY" by Pathak, which is incorporated herein by reference in its entirety.

BACKGROUND

The inventive concepts disclosed herein relate generally to the field of aircraft flight display systems. More particularly, embodiments of the inventive concepts disclosed herein relate to improving situational awareness of an aircraft operator or aircraft control system during an aircraft landing procedure.

Landing is considered a critical phase of a flight. When landing, the pilot generally seeks to touch down on the runway within a threshold window or zone. If the pilot can touch down within the threshold window, then the remaining length of the runway typically provides sufficient distance to bring the aircraft to a complete stop. If the pilot overshoots the threshold window, for example, then there may not be sufficient runway distance to bring the aircraft to a complete stop.

In some instances, it can be difficult for a pilot to accurately predict an actual touch down point on a runway. For example, heavy wind, turbulence, and other environmental conditions can unexpectedly affect the actual touch down point. Furthermore, a view of the runway through a cockpit of the aircraft may be obstructed or otherwise have low visibility due to weather conditions, which may cause the pilot to choose between attempting a landing or a circling around to repeat the landing procedure. Some existing systems provide messages with basic information (e.g., a "short runway" alert) when an aircraft descends below a threshold altitude and the length of the runway ahead is less than the computed landing field length. However, these messages may not provide sufficient information to the pilot.

SUMMARY

In one aspect, the inventive concepts disclosed herein are directed to a system for an airborne platform. The system includes a display device and a processing circuit communicably coupled to the display device. The display device is configured to provide a display. The processing circuit is configured to determine one or more performance characteristics of the aircraft, a predicted landing path including a predicted touch down point of a runway, and whether the predicted touch down point is within a recommended touch down zone. The processing circuit is further configured to generate a three-dimensional display providing a visual representation of the aircraft, the runway, and the predicted landing path. The visual representation of the predicted landing path is provided as a first color in response to determining the predicted touch down point is within the recommended touch down zone and the visual representation of the predicted landing path is provided as a second color in response to determining the predicted touch down point is not within the recommended touch down zone.

In a further aspect, the inventive concepts disclosed herein are directed to a method. The method includes determining, by a processing circuit, one or more performance characteristics of an aircraft. The method further includes determining, by the processing circuit, a predicted landing path in response to the determined performance characteristics, the predicted landing path including a predicted touch down point of a runway. The method further includes determining, by the processing circuit, whether the predicted touch down point is within a recommended touch down zone. The method further includes generating, by the processing circuit, a three-dimensional display providing a visual representation of the aircraft, the runway, and the predicted landing path. The visual representation of the predicted landing path is provided as a first color in response to determining the predicted touch down point is within the recommended touch down zone and the visual representation of the predicted landing path is provided as a second color in response to determining the predicted touch down point is not within the recommended touch down zone.

In a further aspect, the inventive concepts disclosed herein are directed to a processing circuit having a processor and a memory. The processing circuit is configured to determine one or more performance characteristics of the aircraft. The processing circuit is further configured to determine a predicted landing path in response to the determined performance characteristics, the predicted landing path including a predicted touch down point of a runway. The processing circuit is further configured to determine whether the predicted touch down point is within a recommended touch down zone. The processing circuit is further configured to generate a three-dimensional display providing a visual representation of the aircraft, the runway, and the predicted landing path, wherein the visual representation of the predicted landing path is provided as a first color in response to determining the predicted touch down point is within the recommended touch down zone and wherein the visual representation of the predicted landing path is provided as a second color in response to determining the predicted touch down point is not within the recommended touch down zone

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to providing a smart runway landing display. The inventive concepts disclosed herein can be utilized in a number of control and alerting systems for various types of applications, sensing systems, and display systems. While the present disclosure describes systems and methods implementable in an aircraft, the inventive concepts disclosed herein may be used in any type of environment (e.g., in another aircraft, a spacecraft, a ground-based vehicle, or in a non-vehicle application such as a ground-based display system, an air traffic control system, a radar system, a virtual display system). While certain examples and embodiments of the inventive concepts disclosed herein are described with respect to a pilot of an aircraft, it will be appreciated that users other than a pilot may use and benefit from the inventive concepts disclosed herein with respect to other vehicles and/or objects.

Figure 1:
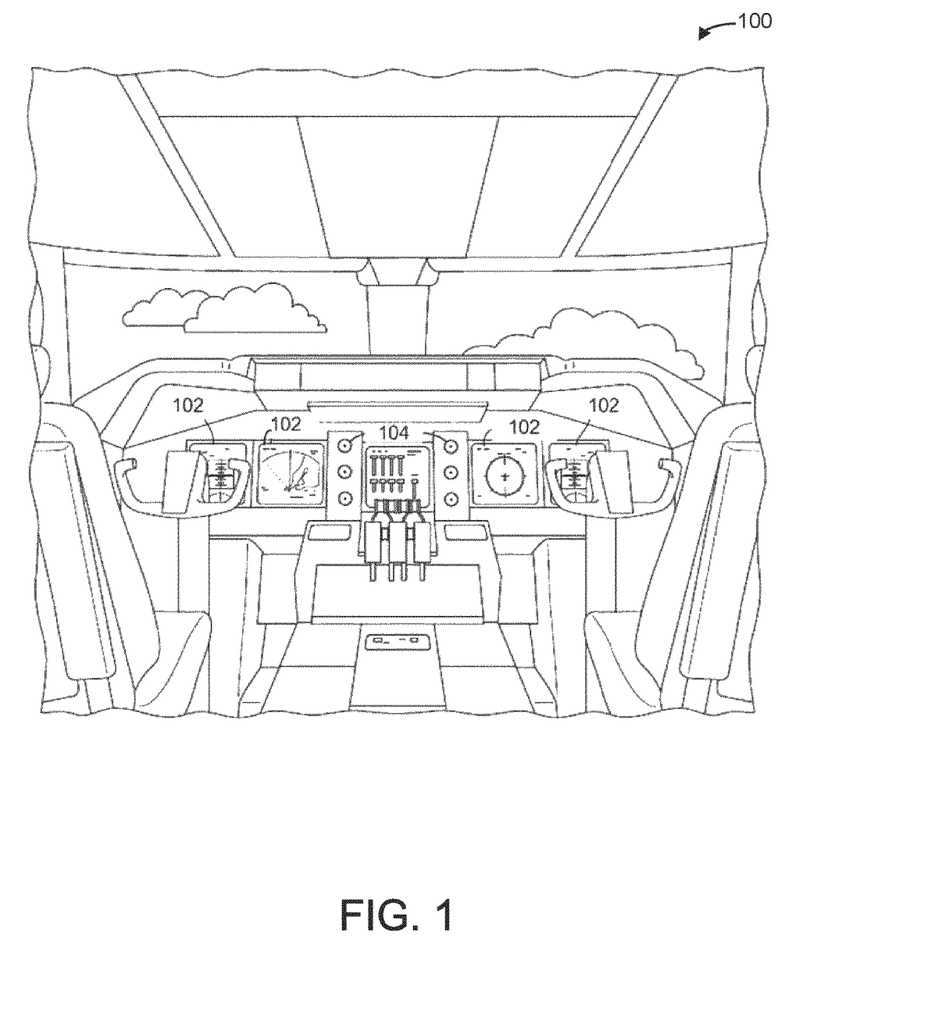
FIG. 1 is a schematic illustration of an exemplary embodiment of a control center of an aircraft, according to the inventive concepts disclosed herein.

Referring now to FIG. 1, a schematic illustration of an exemplary embodiment of a control center of an aircraft is shown according to the inventive concepts disclosed herein. The aircraft control center 100 (or "cockpit") includes one or more flight displays 102 and one or more user interface (UI) elements 104. The flight displays 102 may be implemented using any of a variety of display technologies, including CRT, LCD, organic LED, dot matrix display, and others. The flight displays 102 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass® and so on. The flight displays 102 may be used to provide information to the flight crew, thereby increasing the flight crew's visual range and enhancing their decision-making abilities. The flight displays 102 may be configured to function as, for example, a primary flight display (PFD) used to display altitude, airspeed, vertical speed, navigation and traffic collision avoidance system (TCAS) advisories; a crew alert system (CAS) configured to provide alerts to the flight crew; a multi-function display used to display navigation maps, weather radar, electronic charts, TCAS traffic, aircraft maintenance data and electronic checklists, manuals, and procedures; an engine indicating and crew-alerting system (EICAS) display used to display critical engine and system status data, and so on. Other types and functions of the flight displays 102 are contemplated and will be apparent to those skilled in the art. According to various exemplary embodiments of the inventive concepts disclosed herein, at least one of the flight displays 102 may be configured to provide a rendered display from the systems and methods described herein.

In some embodiments, the flight displays 102 provide an output from an aircraft-based system, a ground-based system, a satellite-based system, or from a system of another aircraft. In some embodiments, the flight displays 102 provide an output from an aircraft-based weather radar system, LIDAR system, infrared system or other system on the aircraft. For example, the flight displays 102 may include an avionics display, a joint display, an air traffic display, a weather radar map, and a terrain display. The flight displays 102 include an electronic display or a synthetic vision system (SVS). For example, the flight displays 102 may include a display configured to display a two-dimensional (2-D) image, a three-dimensional (3-D) perspective image, or a four-dimensional (4-D) display. Other views of air traffic information, terrain, and/or weather information may also be provided (e.g., plan view, horizontal view, and vertical view). The views shown on the flight displays 102 may include monochrome or color graphical representations of the displayed information, which may include an indication of altitude of other aircraft, weather conditions, or terrain, or the altitude and/or location of such information relative to the aircraft. In some embodiments, the views on the flight displays 102 include a two-dimensional visual representation that includes a runway, such as a Jeppesen chart. In some embodiments, the views on the flight displays 102 include a three-dimensional visual representation that includes the aircraft, a runway, a landing path, a virtual landing tunnel, and/or a touch down point on the runway.

The UI elements 104 may include, for example, dials, switches, buttons, touch screens, keyboards, a mouse, joysticks, cursor control devices (CCDs) or other multi-function key pads certified for use with avionics systems. The UI elements 104 may be configured to, for example, allow an aircraft crew member to interact with various avionics applications and perform functions such as data entry, manipulation of navigational maps, and moving among and selecting checklist items. For example, the UI elements 104 may be used to adjust features of the flight displays 102, such as contrast, brightness, width, and length. The UI elements 104 may also (or alternatively) be used by an aircraft crew member to interface with or manipulate the displays of the flight displays 102. For example, the UI elements 104 may be used by an aircraft crew member to adjust the brightness, contrast, and information displayed on the flight displays 102. The UI elements 104 may additionally be used to acknowledge or dismiss an indicator provided by the flight displays 102. Further, the UI elements 104 may be used to correct errors on the flight displays 102. Other UI elements 104, such as indicator lights, displays, display elements, and audio alerting devices, may be configured to warn of potentially threatening conditions such as severe weather, terrain, and obstacles.

Figure 2:
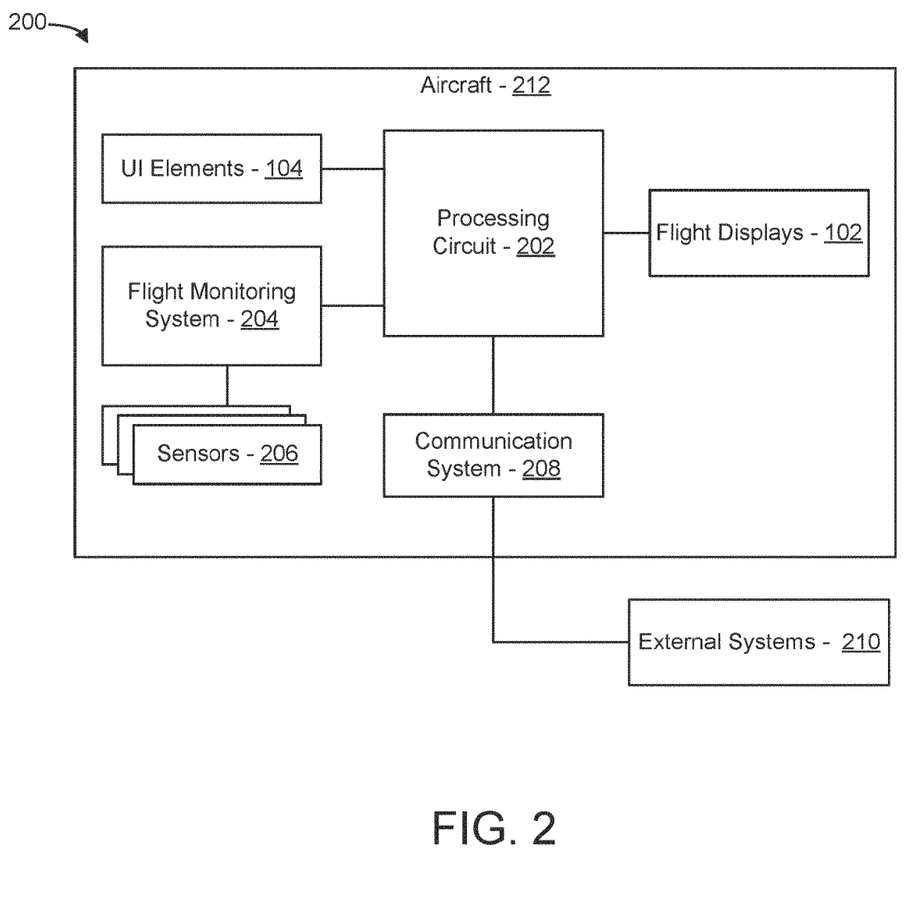
FIG. 2 is block diagram of a system configured to generate a smart runway landing display, according to the inventive concepts disclosed herein.

Referring now to FIG. 2, a system 200 configured to generate a smart runway landing display is shown according to the inventive concepts disclosed herein. The system 200 is shown to include a processing circuit 202, the flight displays 102, the UI elements 104, a flight monitoring system 204, a plurality of sensors 206, and a communication system 208 provided in an aircraft 212 (or an "airborne platform"). In some embodiments, one or more of the processing circuit 202, the flight displays 102, the UI elements 104, the flight monitoring system 204, the plurality of sensors 206, and the communication system 208 is provided as part of a synthetic vision system (SVS). In some embodiments, one or more of the processing circuit 202, the flight displays 102, the UI elements 104, the flight monitoring system 204, the plurality of sensors 206, and the communication system 208 is provided external to the aircraft 212. In some embodiments, the system 200 includes other systems and components for general aircraft operation, such as a weather radar system.

The processing circuit 202 can be configured to send data to and receive data from, or otherwise facilitate electronic data communications, with the other systems of the system 200 or with remote systems such as satellite-based systems or ground-based systems. The processing circuit 202 can interface with an aircraft control system, aircraft monitoring system, or other such system. The processing circuit 202 can generally be configured to receive input from the various other systems to determine aircraft performance characteristics, corrected performance characteristics, travel paths (e.g., a predicted landing path, a landing tunnel), a predicted touch down point, and a recommended touch down zone based on the input. The processing circuit 202 can generally be configured to generate a three-dimensional or two-dimensional visual representation of the determined travel paths, predicted touch down point, and recommended touch down zone. The structure of the processing circuit 202 is shown in greater detail in FIG. 3 and the activities of the processing circuit 202 are explained in greater detail with respect to FIG. 3.

The plurality of sensors 206 may include, for example, one or more fuel sensors, location tracking sensors (e.g., GPS), turbulence sensors, pressure sensors, optical systems (e.g., camera system, infrared system), weather sensors, such as outside air temperature sensors, winds at altitude sensors, INS G load (in-situ turbulence) sensors, barometric pressure sensors, humidity sensors, or any other aircraft sensors or sensing system that may be used to monitor the performance of an aircraft or weather local to or remote from the aircraft. The sensors 206 may include one or more sensors configured to acquire data indicative of speed (e.g., indicated airspeed, a true airspeed, and groundspeed), an angle of attack, a pitch angle, a flight path angle, an acceleration, a rate of descent, and/or an altitude. The sensors 206 may be located in various positions on the aircraft 212, and a single sensor may be configured to acquire more than one type of sensor data. Data from the sensors 206 is output to the flight monitoring system 204 and/or the processing circuit 202 (not shown) for further processing and display as described below.

The flight monitoring system 204 can be configured to acquire flight data indicative of at least one performance characteristic of the aircraft 212. For example, in some embodiments, the flight monitoring system 204 is configured to receive data from the sensors 206. The performance characteristics can relate to speed (e.g., indicated airspeed, a true airspeed, groundspeed), acceleration, a pitch angle, a flight path angle, a flap position, a thruster setting, altitude, and/or rate of descent of the aircraft 212. The flight monitoring system 204 can include at least one of a GPS, a Global Navigation Satellite System (GNSS), an altitude heading and reference system (AHRS), and an inertial reference system (IRS). In some embodiments, the flight monitoring system 204 is configured to receive and/or store information relating to the aircraft 212. For example, the flight monitoring system 204 can be configured to receive and store an aircraft weight value. Data from the flight monitoring system 204 can be output to the processing circuit 202 for determining an effect of the performance characteristics on the aircraft 212 during landing or a landing approach. In this regard, the flight monitoring system 204 is communicably coupled to the processing circuit 202.

The communication system 208 can be configured to facilitate communications between the processing circuit 202 and an external systems 210 (e.g., a satellite system, other aircraft, a terrestrial station, or other air, space, or ground-based system). For example, the communication system 208 can send data to and receive data from external ground-based weather supplier systems and ground-based air traffic control systems. The communication system 208 can be configured to communicate with the external systems 210 using any type of communication protocol or network (e.g., via a mobile network, via one or more bi-directional or uni-directional communication channels) and can include any type of wired or wireless interface for facilitating the communication. It should be understood that the information received by the processing circuit 202 as described in the present disclosure can come from any internal or external source.

Figure 3:
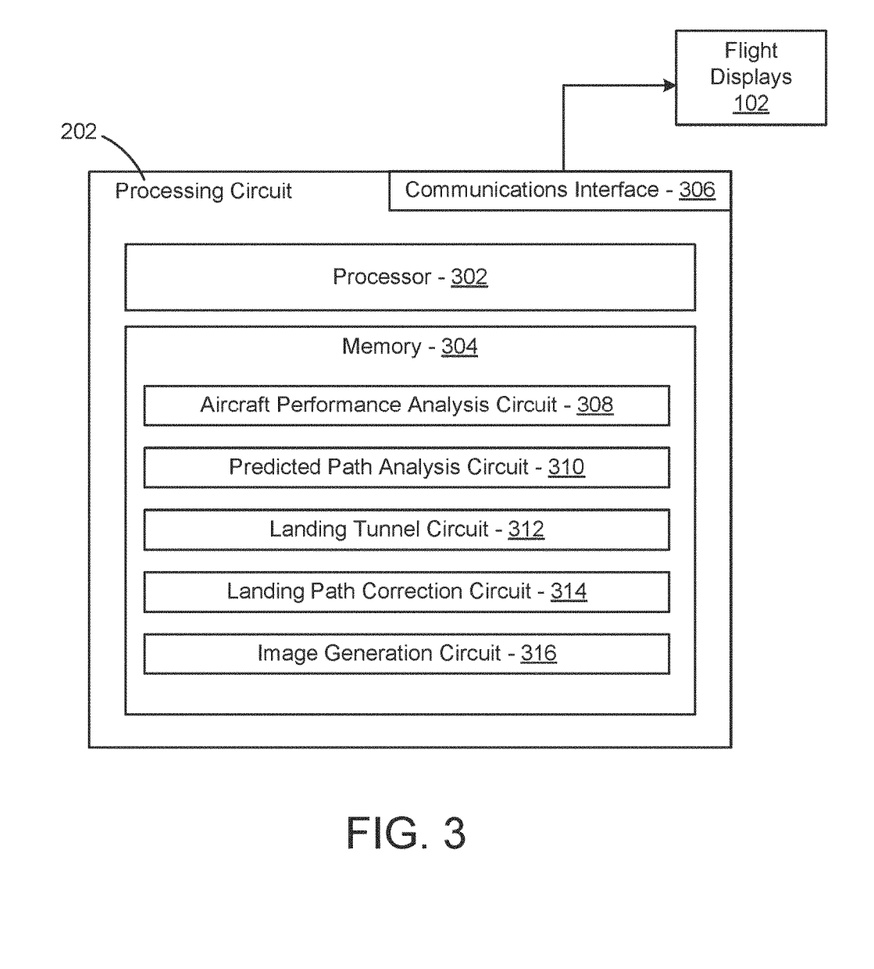
FIG. 3 is a block diagram of the processing circuit of the system configured to generate a smart runway landing display of FIG. 2, according to the inventive concepts disclosed herein.

Referring now to FIG. 3, the processing circuit 202 of the system 200 of FIG. 2 is shown in further detail according to the inventive concepts disclosed herein. The processing circuit 202 is shown to include a processor 302, a memory 304, and a communications interface 306. The communications interface 306 can be a wired or wireless interface configured to facilitate communications between the processing circuit 202 and the other components and systems of the system 200. The processor 302 can be implemented as a general or specific purpose processor, an application specific integrated circuit (ASIC), one or more field programmable gate arrays (FPGAs), a group of processing components, or other suitable electronic processing components.

The memory 304 is one or more devices (e.g., RAM, ROM, flash memory, hard disk storage) for storing data and computer code for completing and facilitating the various user or client processes, layers, and modules described in the present disclosure. The memory 304 may be or include volatile memory or non-volatile memory and may include database components, object code components, script components, or any other type of information structure for supporting the various activities and information structures of the inventive concepts disclosed herein. The memory 304 is communicably connected to the processor 302 and includes computer code or instruction modules for executing one or more processes described herein. The memory 304 can include various circuits, software engines, and/or modules that cause the processor 302 to execute the systems and methods described herein. In some embodiments, the processing circuit 202 also includes a graphics processing unit (GPU) (not shown), which can be configured to retrieve electronic instructions for generating a visual representation for one or more of the flight displays 102 and execute the electronic instructions in order to generate the visual representation.

The memory 304 is shown to include an aircraft performance analysis circuit 308, a predicted path analysis circuit 310, a landing tunnel circuit 312, a landing path correction circuit 314, and an image generation circuit 316. In some embodiments, the aircraft performance analysis circuit 308, the predicted path analysis circuit 310, the landing tunnel circuit 312, the landing path correction circuit 314, and the image generation circuit 316 are embodied as machine or computer-readable media that is executable by a processor, such as the processor 302. As described herein and amongst other uses, the machine-readable media facilitates performance of certain operations to enable generation of images relating to a landing path of the aircraft 212. For example, the machine-readable media can provide an instruction (e.g., command, etc.) to acquire data. In this regard, the machine-readable media can include programmable logic that defines the frequency of acquisition of the data (or, transmission of the data). The computer readable media can include code, which can be written in any programming language including, but not limited to, Java or the like and any conventional procedural programming languages, such as the "C" programming language or similar programming languages. The computer readable program code can be executed on one processor or multiple remote processors. In the latter scenario, the remote processors can be connected to each other through any type of network (e.g., CAN bus, etc.).

In another configuration, the aircraft performance analysis circuit 308, the predicted path analysis circuit 310, the landing tunnel circuit 312, the landing path correction circuit 314, and the image generation circuit 316 are embodied as hardware units, such as electronic control units. As such the aircraft performance analysis circuit 308, the predicted path analysis circuit 310, the landing tunnel circuit 312, the landing path correction circuit 314, and the image generation circuit 316 can be embodied as one or more circuitry components including, but not limited to, processing circuitry, network interfaces, peripheral devices, input devices, output devices, sensors, etc.

In some embodiments, the aircraft performance analysis circuit 308, the predicted path analysis circuit 310, the landing tunnel circuit 312, the landing path correction circuit 314, and the image generation circuit 316 can take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the aircraft performance analysis circuit 308, the predicted path analysis circuit 310, the landing tunnel circuit 312, the landing path correction circuit 314, and the image generation circuit 316 can include any type of component for accomplishing or facilitating achievement of the operations described herein. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on), and programmable hardware devices (e.g., field programmable gate arrays, programmable array logic, programmable logic devices or the like). The aircraft performance analysis circuit 308, the predicted path analysis circuit 310, the landing tunnel circuit 312, the landing path correction circuit 314, and the image generation circuit 316 can each include a processor and one or more memory devices for storing instructions that are executable by each of the processors. The one or more memory devices and processor(s) can have the same definition as provided herein with respect to the memory 304 and the processor 302.

In some hardware unit configurations, the aircraft performance analysis circuit 308, the predicted path analysis circuit 310, the landing tunnel circuit 312, the landing path correction circuit 314, and/or the image generation circuit 316 can be physically located in separate locations in the processing circuit 202. Alternatively, the aircraft performance analysis circuit 308, the predicted path analysis circuit 310, the landing tunnel circuit 312, the landing path correction circuit 314, and/or the image generation circuit 316 can be embodied in or within a single unit/housing of the processing circuit 202. In some embodiments, the aircraft performance analysis circuit 308, the predicted path analysis circuit 310, the landing tunnel circuit 312, the landing path correction circuit 314, and/or the image generation circuit 316 can be a hybrid of any device disclosed above, such as a specific purpose processor or task execution unit (e.g., configured to execute a micro node) with additional circuitry specifically configured to execute bandwidth calculations, frame analysis, or routing determinations.

The aircraft performance analysis circuit 308 can be configured to determine one or more performance characteristics of the aircraft 212. The performance characteristics generally relate to the performance or operation of the aircraft 212. Some examples of performance characteristics can relate to speed (e.g., indicated airspeed, a true airspeed, groundspeed), acceleration, a pitch angle, a flight path angle, altitude, location, a flap position, a thruster setting, and/or rate of descent of the aircraft 212. In some embodiments, the aircraft performance analysis circuit 308 is configured to determine one or more performance characteristics when the aircraft enters a landing configuration, such as when the aircraft 212 is within a threshold distance or altitude relative to the runway, when the aircraft 212 is collinear with the runway, and/or when the aircraft 212 has deployed its landing gear.

In some embodiments, the aircraft performance analysis circuit 308 is configured to receive data relating to performance characteristics from the flight monitoring system 204, the sensors 206, the UI elements 104, and/or the communication system 208. In some embodiments, the aircraft performance analysis circuit 308 is configured to store performance characteristics for subsequent use. In some embodiments, the aircraft performance analysis circuit 308 can be configured to store a chronological sequence of location and altitude positions to generate a previous travel path.

The predicted path analysis circuit 310 can be configured to determine a predicted landing path of the aircraft. In some embodiments, the predicted path analysis circuit 310 is configured to determine a predicted landing path based on a previous travel path by, for example, extrapolating the previous travel path of the aircraft to determine the predicted landing path of the aircraft should the aircraft maintain its current path. In some embodiments, the predicted path analysis circuit 310 is configured to determine a predicted landing path based on aircraft performance characteristics, environmental conditions (e.g., wind, barometric air pressure, temperature) and/or a position of the aircraft relative to the runway. The predicted landing path can be represented as a straight or curved line. In some embodiments, the predicted landing path is determined based on one or more trends (e.g., a downward-curving trend, increase of descent rate, a steady flat path) of the aircraft. In some embodiments, the predicted path analysis circuit 310 is also configured to determine a predicted touch down point. The predicted touch down point can represent an endpoint of the predicted landing path (e.g., the predicted landing path terminates at the predicted touch down point).

The landing tunnel circuit 310 can be configured to determine a "virtual" landing tunnel corresponding to a recommended landing path for safely landing on the runway. In some embodiments, the landing tunnel is generally a three-dimensional volume or path that the aircraft should be within during an approach to a runway as the aircraft descends for landing. In some embodiments, the landing tunnel circuit 310 can be configured to determine the landing tunnel based on a recommended touch down zone and a position of the aircraft relative to the recommended touch down zone.

The recommended touch down zone can relate to an area along a length of the runway in which the aircraft can touch down to complete a safe landing. By navigating within the landing tunnel, the aircraft can touch down within the recommended touch down zone and have sufficient distance along a length of the runway to come to a complete stop. The recommended touch down zone can be defined by a lower limit (e.g., exceeding the lower limit causes an undershoot) and an upper limit (e.g., exceeding the upper limit causes an overshoot).

The landing tunnel circuit 310 can be configured to determine the recommended touch down zone using any suitable method. In some embodiments, the recommended touch down zone is determined using one or more lookup tables. In some embodiments, the recommended touch down zone is determined based on aircraft weight, aircraft performance characteristics, environmental conditions (e.g., wind speed and direction, air pressure), runway parameters (e.g., surface contamination, slope, length), and/or any other aircraft performance characteristics or information useful for determining a recommended touch down zone. For example, when the aircraft weight is above a threshold value or when environmental conditions indicate a heavy tailwind, the landing tunnel circuit 310 may determine a recommended touch down zone relating to additional runway distance for stopping the aircraft (e.g., a smaller recommended touch down zone).

In some embodiments, the landing tunnel circuit 310 is configured to dynamically adjust the landing tunnel. The landing tunnel circuit 310 can be configured to update or otherwise modify the landing tunnel according to a predetermined time interval as the aircraft 212 continues its landing approach. For example, if the aircraft 212 is not travelling within the landing tunnel (e.g., the aircraft 212 is descending too quickly or slowly), the landing tunnel circuit 310 can be configured to dynamically change the landing tunnel (e.g., to alter a flight path angle for the aircraft 212 to reach the runway within the recommended touch down zone).

The landing path correction circuit 314 can be configured to determine one or more corrections to performance characteristics of the aircraft 212 that can cause the aircraft to enter the landing tunnel. For example, the landing path correction circuit 314 can be configured to monitor a previous travel path and/or a current position of the aircraft to determine whether the aircraft is navigating within the landing tunnel. In some embodiments, the landing path correction circuit 314 can be configured to monitor a predicted landing path and/or aircraft performance characteristics, to determine whether the aircraft will exit the landing tunnel (e.g., if the aircraft continues along a predicted landing path).

The landing path correction circuit 314 can be configured to determine any suitable correction of aircraft performance characteristics in response to determining the aircraft is not navigating within the landing tunnel or the aircraft may exit the landing tunnel. Examples of corrected aircraft performance characteristics can include a thruster setting, a flap setting, an airspeed, a ground speed, descent rate, pitch angle, flight path angle, descent rate, acceleration, etc.

The image generation circuit 316 can be configured to generate a visual representation of one or more of the predicted landing path, the landing tunnel, the predicted touch down point, the corrections to performance characteristics, and the recommended touch down zone for display. The image generation circuit 316 can be configured to generate the visual representation for display by one or more of the flight displays 102. In some embodiments, the visual representation is provided as a three-dimensional perspective that includes the aircraft, the runway, and terrain information in addition to the predicted landing path, the landing tunnel, the predicted touch down point, the corrections to performance characteristics, and/or the recommended touch down zone. In some embodiments the visual representation is provided as a two-dimensional perspective (e.g., a Jeppesen chart) with the predicted touch down point and/or the recommended touch down zone.

In an example embodiment, the visual representation of the predicted landing path is generally linear (e.g., a straight or curved line) terminating at the predicted touch down point, and a visual representation of the landing tunnel is generally a three-dimensional volume terminating at a point within the recommended touch down zone. Thus, the landing tunnel can indicate a three-dimensional path that the aircraft should be within during an approach to a runway as the aircraft descends for landing. The landing tunnel can also indicate how closely the aircraft is tracking the landing tunnel and whether the aircraft has deviated a threshold distance from the landing tunnel. For example, the landing tunnel can be depicted in front of the aircraft and a predicted landing path can be shown extending from the aircraft and either being contained within the landing tunnel or crossing beyond the landing tunnel.

In some embodiments, the image generation circuit 316 is configured to determine whether the predicted touch down point is within the recommended touch down zone. For example, the image generation circuit 316 can compare the predicted touch down point to an upper limit value and a lower limit value of the touch down zone. The image generation circuit 316 can be configured to provide an indication to the operator of the aircraft (e.g., on the flight display 102) based on whether the predicted touch down point is within the recommended touch down zone (e.g., the predicted touch down point exceeds the upper limit value or does not exceed the lower limit value).

In some embodiments, the image generation circuit 316 is configured to provide the indication as a color. In an example embodiment, the image generation circuit 316 can be configured to provide a three-dimension visual representation that includes the predicted landing path and/or the predicted touch down point as a green color in response to determining the predicted touch down point is within the recommended touch down zone; the image generation circuit 316 can provide the predicted landing path and/or the predicted touch down point as a red color in response to determining the predicted touch down point is not within the recommended touch down zone. In some embodiments, the predicted landing path can be displayed in relation to the landing tunnel, and any deviations can be indicated.

In another example embodiment, the image generation circuit 316 can be configured to provide a two-dimension visual representation (e.g., a Jeppesen chart) with the predicted touch down point as a green color in response to determining the predicted touch down point is within the recommended touch down zone; the image generation circuit 316 can provide the two-dimension visual representation with the predicted touch down point as a red color in response to determining the predicted touch down point is not within the recommended touch down zone. Embodiments can use any combination of colors, shapes (e.g., a diamond shape representing the predicted touch down point), line types (e.g., dotted or straight), or any other suitable system for providing the indication to the operator.

The image generation circuit 316 can be configured to generate the display using any of the information and data used or generated by the processing circuit 202, such as the previous travel path of the aircraft, the landing tunnel, the recommended touch down zone, aircraft performance characteristics, and corrections of aircraft performance characteristics. For example, the generated display can include the previous travel path, the predicted landing path, and the landing tunnel with an indication relating to whether the aircraft is projected to remain in the landing tunnel. In some embodiments, the image generation circuit 316 can be configured to display other information that may be useful to the operator, such as information received from the external systems 210 via the communication system 208 (e.g., runway surface contamination information), information received from the flight monitoring system 204 (e.g., a current position), and information received from the sensors 206.

Figure 4:
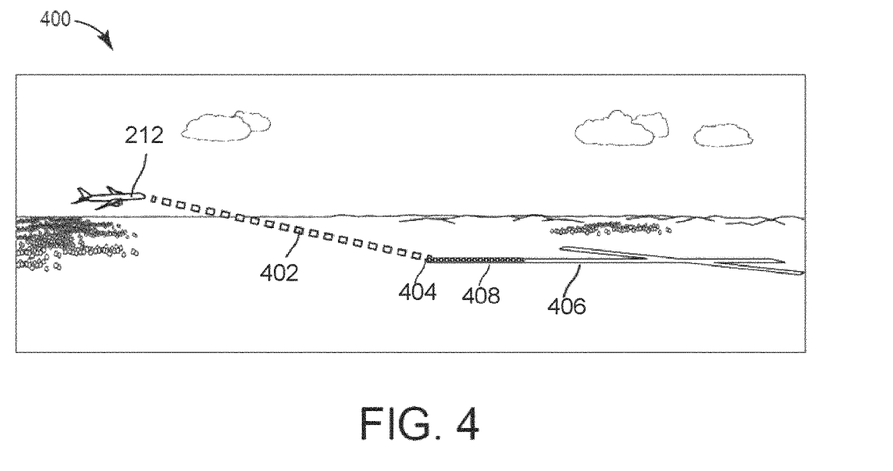
FIG. 4 is an example screenshot illustrating a smart runway landing display provided on an aircraft display device, according to the inventive concepts disclosed herein.
Figure 5:
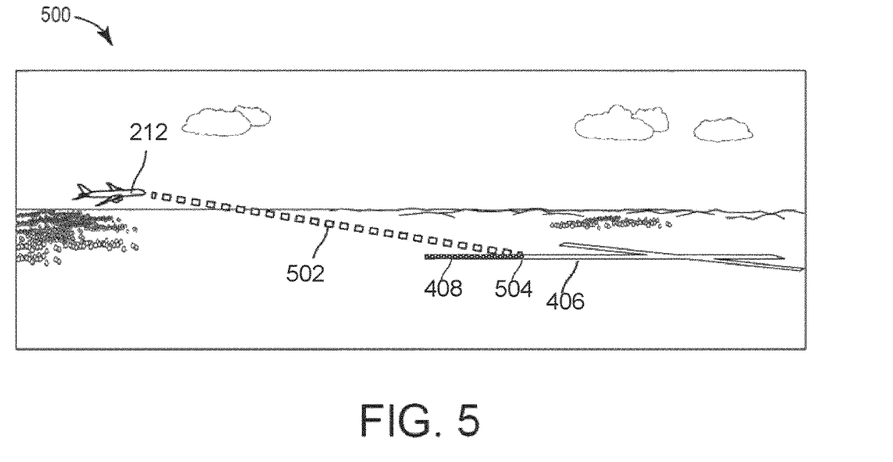
FIG. 5 is another example screenshot illustrating a smart runway landing display provided on an aircraft display device, according to the inventive concepts disclosed herein.
Figure 6:
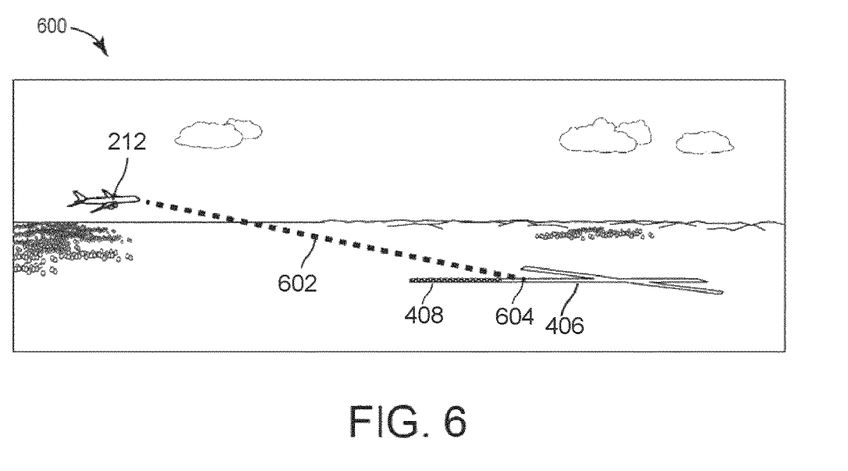
FIG. 6 is another example screenshot illustrating a smart runway landing display provided on an aircraft display device, according to the inventive concepts disclosed herein.
Figure 7:
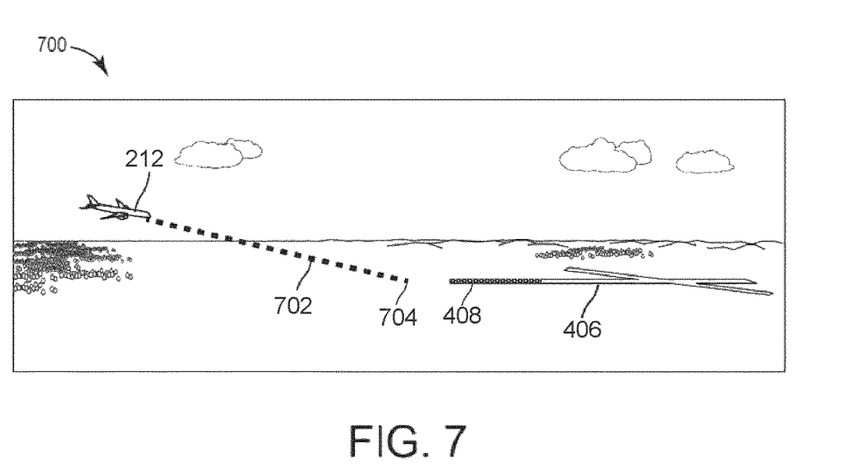
FIG. 7 is another example screenshot illustrating a smart runway landing display provided on an aircraft display device, according to the inventive concepts disclosed herein.

Referring to FIGS. 4-7, various example screenshots of visualizations showing a smart runway landing display are shown according to the inventive concepts disclosed herein. In some embodiments, one or more of the visualizations can be displayed by the flight displays 102. Each screenshot of FIGS. 4 and 5 shows a predicted touch down point of the aircraft 212 within a recommended touch down zone. In contrast, each screenshot of FIGS. 6 and 7 shows a predicted touch down point of the aircraft 212 not within the recommended touch down zone.

Referring to FIG. 4, an example screenshot 400 shows a visualization of the aircraft 212 approaching a runway 406 for landing. The screenshot 400 also shows a visualization of a recommended touch down zone 408. The recommended touch down zone 408 represents an area along a length of the runway in which the aircraft can touch down to complete a safe landing as described above with reference to FIG. 3.

The screenshot 400 also shows a predicted landing path 402 with a predicted touch down point 404 within the recommended touch down zone 408 on the runway 406. The predicted landing path can be based on a previous travel path by, for example, extrapolating the previous travel path of the aircraft to determine the predicted landing path of the aircraft should the aircraft maintain its current path. The screenshot 400 can include an indication relating to whether the aircraft 212 is predicted to land within the recommended touch down zone 408 by determining whether the predicted touch down point 404 is within the recommended touch down zone 408. For example, the indication can relate to providing the predicted landing path 402 in a green color because the predicted touch down point 404 is within the recommended touch down zone 408.

FIG. 5 shows another example screenshot 500 with the aircraft 212 approaching the runway 406 for landing. The screenshot 500 shows a predicted landing path 502 with a predicted touch down point 504 within the recommended touch down zone 408. The screenshot 500 can include an indication relating to whether the aircraft 212 is predicted to land within the recommended touch down zone 408 by determining whether the predicted touch down point 504 is within the recommended touch down zone 408. Accordingly, similar to the visualization of screenshot 400, the indication can relate to providing the predicted landing path 502 in a green color because the predicted touch down point 504 is within the recommended touch down zone 408.

FIG. 6 shows another example screenshot 600 with the aircraft 212 approaching the runway 406 for landing. The screenshot 600 shows a predicted landing path 602 with a predicted touch down point 604 overshooting the recommended touch down zone 408 and thus not within the recommended touch down zone 408. The screenshot 600 can include an indication relating to whether the aircraft 212 is predicted to land within the recommended touch down zone 408 by determining whether the predicted touch down point 604 is within the recommended touch down zone 408. The indication can relate to providing the predicted landing path 602 in a red color because the predicted touch down point 604 is not within the recommended touch down zone 408.

FIG. 7 shows another example screenshot 700 with the aircraft 212 approaching the runway 406 for landing. The screenshot 700 shows a predicted landing path 702 with a predicted touch down point 704 undershooting the recommended touch down zone 408 and thus not within the recommended touch down zone 408. The screenshot 700 can include an indication relating to whether the aircraft 212 is predicted to land within the recommended touch down zone 408 by determining whether the predicted touch down point 704 is within the recommended touch down zone 408. The indication can relate to providing the predicted landing path 702 in a red color because the predicted touch down point 704 is not within the recommended touch down zone 408.

Each of the screenshots 400-700 can include any color for providing an indication or otherwise use any type of indication (e.g., a line type). Although each of the screenshots 400-700 shows a three-dimensional visualization, a two-dimensional visualization can additionally or alternatively be provided. In some embodiments, each of the screenshots 400-700 can additionally or alternatively include a landing tunnel, performance characteristics, and/or corrections to performance characteristics.

Figure 8:
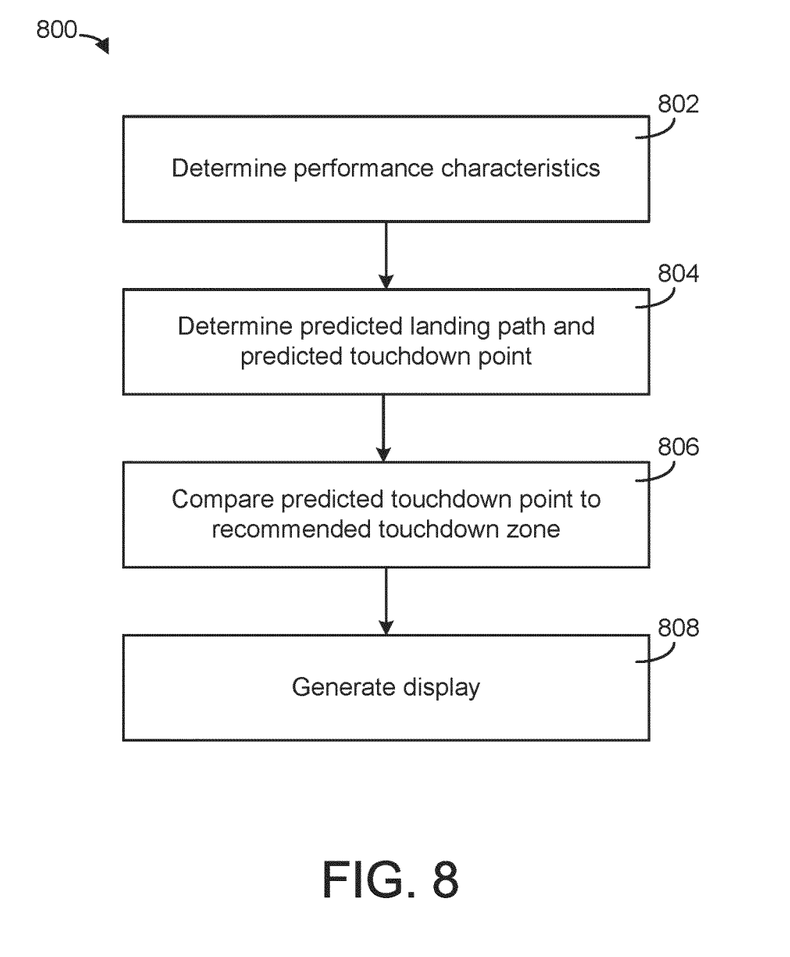
FIG. 8 is a diagram of an exemplary embodiment of a method of providing a smart runway landing display, according to the inventive concepts disclosed herein.

Referring now to FIG. 8, a method 800 for generating a smart runway landing display is shown according to the inventive concepts disclosed herein. Although the embodiment described below describes the method 800 as being performed by the processing circuit 202, the method 800 may be performed using various hardware, apparatuses, and systems disclosed herein, such as the aircraft cockpit 100 and/or components or features of the system 200.

At step 802, the processing circuit 202 determines performance characteristics generally relating to the performance or operation of the aircraft 212. Some examples of performance characteristics include airspeed, a ground speed, a descent rate, a pitch angle, a flight path angle, a flap position, a location, an altitude, and acceleration. In some embodiments, the processing circuit 202 determines performance characteristics based on data received from the flight monitoring system 204, the sensors 206, the UI elements 104, and/or the communication system 208. In some embodiments, the processing circuit 202 determines one or more performance characteristics when the aircraft 212 enters a landing configuration, such as when the aircraft 212 is within a threshold distance or altitude relative to the runway, when the aircraft 212 is collinear with the runway, and/or when the aircraft 212 has deployed its landing gear.

At step 804, the processing circuit 202 determines a predicted landing path and a predicted touch down point. The predicted landing path can be determined based on a previous travel path by, for example, extrapolating the previous travel path of the aircraft to determine the predicted landing path of the aircraft should the aircraft maintain its current path. In some embodiments, the predicted landing path is determined based on aircraft performance characteristics, environmental conditions (e.g., wind, barometric air pressure, temperature) and/or a position of the aircraft relative to the runway. The predicted landing path can be represented as a straight or curved line. In some embodiments, the predicted landing path is determined based on one or more trends (e.g., a downward-curving trend, increase of descent rate, a steady flat path) of the aircraft. The predicted touch down point can be determined based on the predicted landing path.

At step 806, the processing circuit 202 compares the predicted touch down point to a recommended touch down zone. The recommended touch down zone can relate to an area along a length of the runway in which the aircraft can touch down to complete a safe landing.

In some embodiments, step 806 additionally involves determining a "virtual" landing tunnel corresponding to a recommended landing path for the aircraft to adequately land on the runway. For example, the landing tunnel may terminate at the recommended touch down zone. In some embodiments, the landing tunnel is generally a three-dimensional volume or path that the aircraft should be within during an approach to a runway as the aircraft descends for landing. The recommended touch down zone can be based on aircraft weight, pitch angle, flight path angle, air speed, ground speed flap settings, environmental conditions (e.g., wind speed and direction, air pressure), runway parameters (e.g., surface contamination and slope), and/or any other aircraft performance characteristics or information useful for determining a recommended touch down zone.

In some embodiments, the landing tunnel is dynamically adjusted according to a predetermined time interval as the aircraft 212 continues its landing approach. For example, if the aircraft 212 is not travelling within the landing tunnel (e.g., the aircraft 212 is descending too quickly or slowly), the processing circuit 202 can dynamically change the landing tunnel (e.g., to alter a flight path angle for the aircraft 212 to reach the runway within the recommended touch down zone). By navigating within the landing tunnel, the aircraft can touch down within the recommended touch down zone and adequately land on the runway.

At step 808, the processing circuit 202 generates a display. The display can be a visual representation including one or more of the predicted landing path, the landing tunnel, the predicted touch down point, and the recommended touch down zone. The display can be provided by one or more of the flight displays. In some embodiments, the visual representation is provided as a three-dimensional perspective that includes the aircraft, the runway, and terrain information in addition to the predicted landing path, the landing tunnel, the predicted touch down point, and/or the recommended touch down zone. In some embodiments, the visual representation is provided as a two-dimensional perspective (e.g., a Jeppesen chart) with the predicted touch down point and/or the recommended touch down zone.

In some embodiments, the display includes an indication based on whether the predicted touch down point is within the recommended touch down zone. In some embodiments, the indication is provided as a color. In an example embodiment, the display includes a three-dimension visual representation that includes the predicted landing path and/or the predicted touch down point as a green color in response to determining the predicted touch down point is within the recommended touch down zone. In this example embodiment, the display includes the predicted landing path and/or the predicted touch down point as a red color in response to determining the predicted touch down point is not within the recommended touch down zone. In some embodiments, the predicted landing path can be displayed in relation to the landing tunnel, and any deviations can be indicated.

The display can be provided using any of the information and data used or generated by the processing circuit 202, such as the previous travel path of the aircraft, the landing tunnel, the recommended touch down zone, aircraft performance characteristics, and corrections of aircraft performance characteristics. For example, the generated display can include the previous travel path, the predicted landing path, and the landing tunnel with an indication relating to whether the aircraft is projected to remain in a landing tunnel relating to a recommended landing path. In some embodiments, the display can include information received from the external systems 210 via the communication system 208 (e.g., runway surface contamination information), information received from the flight monitoring system 204 (e.g., a current position), and information received from the sensors 206.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

As will be appreciated from the above, systems and methods for controlling operation of an aircraft based on surface conditions according to embodiments of the inventive concepts disclosed herein may improve operation of aircrafts by showing an operator of the aircraft where regions on a surface may have low friction level, and/or controlling operation of a brake or a reverse thruster based on the surface conditions. In some embodiments, the inventive concepts disclosed herein may be applied to takeoff conditions, such as for determining one or more aircraft performance characteristics for safe takeoff.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A method comprising:
    determining, by a processing circuit, one or more performance characteristics of an aircraft;
    determining, by the processing circuit, a predicted landing path in response to the determined performance characteristics, the predicted landing path including a predicted touch down point of a runway;
    determining, by the processing circuit, whether the predicted touch down point is within a recommended touch down zone;
    generating, by the processing circuit, a three-dimensional display providing a visual representation of the aircraft, the runway, and the predicted landing path, wherein the visual representation of the predicted landing path is provided as a first color in response to determining the predicted touch down point is within the recommended touch down zone and wherein the visual representation of the predicted landing path is provided as a second color in response to determining the predicted touch down point is not within the recommended touch down zone;
    determining, by the processing circuit, a three-dimensional landing tunnel, the three-dimensional landing tunnel terminating at a point of the runway within the recommended touch down zone;
    determining, by the processing circuit, one or more corrected performance characteristics, each of the corrected performance characteristics associated with a correction to one of the determined performance characteristics whereby configuring the aircraft according to at least one of the one or more corrected performance characteristics causes the aircraft to enter the three-dimensional landing tunnel; and
    generating, by the processing circuit, the three-dimensional display with an indication of the one or more determined corrected performance characteristics and a visual representation of the three-dimensional landing tunnel.

2. The method of claim 1, wherein the performance characteristics comprises at least one of an airspeed, a ground speed, a descent rate, a pitch angle, a flight path angle, and a flap position.

3. The method of claim 1, wherein the corrected performance characteristics relates to at least one of an airspeed, a ground speed, a descent rate, a pitch angle, a flight path angle, and a flap position.

4. The method of claim 1, wherein the processing circuit determines the predicted landing path by extrapolating a previous travel path of the aircraft.

5. The method of claim 1, further comprising:
    generating, by the processing circuit, a two-dimensional display including a visual representation of the runway and the predicted touch down point, wherein the visual representation of the predicted touch down point is provided as the first color in response to determining the predicted touch down point is within the recommended touch down zone and wherein the visual representation of the predicted touch down point is provided as the second color in response to determining the predicted touch down point is not within the recommended touch down zone.

6. A system for an aircraft, comprising:
    a display device configured to provide a display; and
    a processing circuit communicably coupled to the display device, the processing circuit configured to:
        determine one or more performance characteristics of the aircraft;
        determine a predicted landing path in response to the determined performance characteristics, the predicted landing path including a predicted touch down point of a runway;
        determine whether the predicted touch down point is within a recommended touch down zone;
        generate a three-dimensional display providing a visual representation of the aircraft, the runway, and the predicted landing path, wherein the visual representation of the predicted landing path is provided in a first configuration in response to determining the predicted touch down point is within the recommended touch down zone and wherein the visual representation of the predicted landing path is provided in a second configuration in response to determining the predicted touch down point is not within the recommended touch down zone;
        determine a three-dimensional landing tunnel, the three-dimensional landing tunnel terminating within the recommended touch down zone;
        determine one or more corrected performance characteristics, each of the one or more corrected performance characteristics associated with a correction to one of the determined performance characteristics; and
        generate the three-dimensional display with an indication of the one or more determined corrected performance characteristics and a visual representation of the three-dimensional landing tunnel.

7. The system of claim 6, wherein the performance characteristics comprises at least one of an airspeed, a ground speed, a descent rate, a pitch angle, a flight path angle, and a flap position.

8. The system of claim 6, wherein the corrected performance characteristics relates to at least one of an airspeed, a ground speed, a descent rate, a pitch angle, a flight path angle, and a flap position.

9. The system of claim 6, wherein the processing circuit is further configured to:
generate a two-dimensional display including a visual representation of the runway and the predicted touch down point, wherein the visual representation of the predicted touch down point is provided as a first color in response to determining the predicted touch down point is within the recommended touch down zone and wherein the visual representation of the predicted touch down point is provided as a second color in response to determining the predicted touch down point is not within the recommended touch down zone.

10. The system of claim 6, wherein the processing circuit is further configured to repeatedly determine the one or more performance characteristics of the aircraft according to a predetermined frequency to dynamically adjust the three-dimensional display until the aircraft lands on the runway.

11. The system claim 6, wherein the first configuration is a first color and the second configuration is a second color.

12. The system of claim 6, whereby configuring the aircraft according to at least one of the one or more corrected performance characteristics causes the aircraft to enter the three-dimensional landing tunnel.

13. The system of claim 6, wherein one or more the corrected performance characteristics relates to an airspeed, and a descent rate.

14. The system of claim 6, wherein one or more the corrected performance characteristics relates to a pitch angle, a flight path angle, and a flap position.

15. The system of claim 14, wherein one or more the corrected performance characteristics relates to an airspeed, and a descent rate.

16. A processing circuit of an aircraft, the processing circuit having a processor and a memory, and configured to:
determine one or more performance characteristics of the aircraft;
determine a predicted landing path in response to the determined performance characteristics, the predicted landing path including a predicted touch down point of a runway;
determine whether the predicted touch down point is within a recommended touch down zone; and
generate a three-dimensional display providing a visual representation of the aircraft, the runway, and the predicted landing path, wherein the visual representation of the predicted landing path is provided as a first color in response to determining the predicted touch down point is within the recommended touch down zone and wherein the visual representation of the predicted landing path is provided as a second color in response to determining the predicted touch down point is not within the recommended touch down zone;
determine a three-dimensional landing tunnel, the three-dimensional landing tunnel terminating at a point of the runway within the recommended touch down zone;
determine one or more corrected performance characteristics, each of the corrected performance characteristics associated with a correction to one of the determined performance characteristics; and
generate the three-dimensional display with an indication of the one or more determined corrected performance characteristics and a visual representation of the three-dimensional landing tunnel.

17. The processing circuit of claim 16, wherein the performance characteristics comprises at least one of an airspeed, a ground speed, a descent rate, a pitch angle, a flight path angle, and a flap position.

18. The processing circuit of claim 16, wherein the processing circuit is further configured to:
generate a two-dimensional display including a visual representation of the runway and the predicted touch down point, wherein the visual representation of the predicted touch down point is provided as the first color in response to determining the predicted touch down point is within the recommended touch down zone and wherein the visual representation of the predicted touch down point is provided as the second color in response to determining the predicted touch down point is not within the recommended touch down zone.

19. The processing circuit of claim 16, wherein the processing circuit is further configured to repeatedly determine the one or more performance characteristics of the aircraft according to a predetermined frequency to dynamically adjust the three-dimensional display until the aircraft lands on the runway.

20. The system of claim 16, whereby configuring the aircraft according to at least one of the one or more corrected performance characteristics causes the aircraft to enter the three-dimensional landing tunnel.

* * * * *